Figure 1:
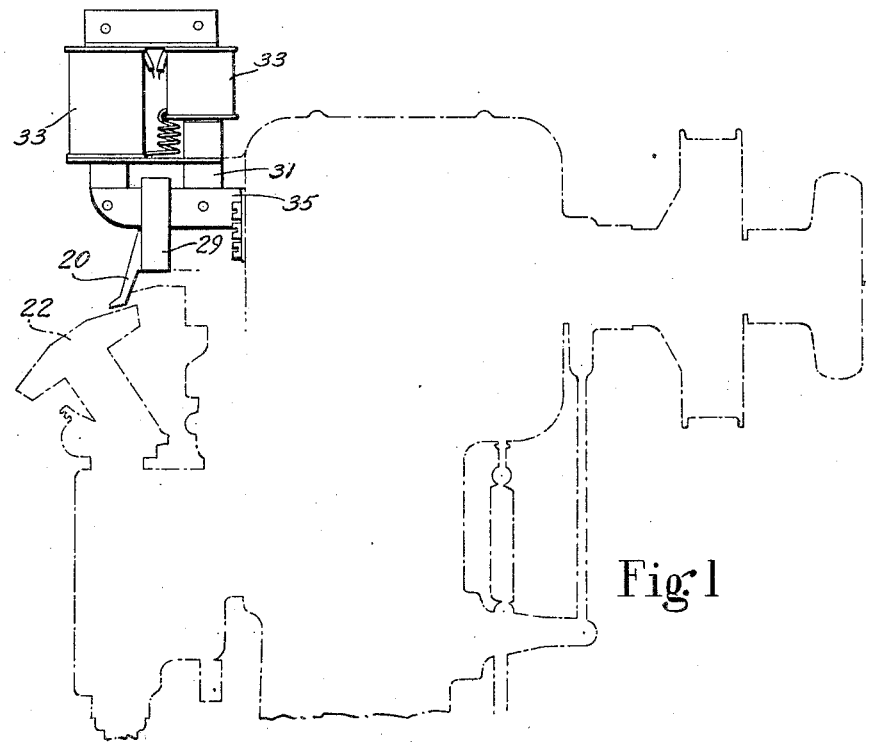

June 15, 1943.     W. S. ROBSON     2,321,704
HEATING MEANS FOR SHOE MACHINE TOOLS
Filed Oct. 31, 1940

INVENTOR:
William S. Robson
By his attorney

Patented June 15, 1943

2,321,704

UNITED STATES PATENT OFFICE 2,321,704

HEATING MEANS FOR SHOE MACHINE TOOLS

William Selwyn Robson, Leicester, England, assignor to United Shoe Machinery Corporation, Flemington, N. J., a corporation of New Jersey Application October 31, 1940, Serial No. 363,751
In Great Britain November 21, 1939

5 Claims. (Cl. 12—41)

This invention relates to shoe machines, and particularly to improved means for heating rapidly moving tools of machines for operating upon shoe parts.

In the making of shoes and shoe parts there are involved numerous operations requiring the use of heated tools which are moved rapidly and in several different directions. Machines for performing such operations are well known in the art and include, as common features, tools which are arranged to be moved rapidly and in various directions to perform their particular operations on the shoe part being treated. To avoid the possibility of damage to the parts being treated by the tool, which is likely to occur where an open gas flame is employed to heat the tool, various types of electric heating devices have been proposed. These generally involve the use of flexible leads for conducting current to a heating unit associated with the movable tool or the use of rubbing contact surfaces for conducting current to such a unit or for conveying heat by conduction to the moving tool from a stationary heating unit. It has also been proposed to heat a moving tool by radiation from an electric heating unit fixed to the machine and placed in close proximity to the tool.

These arrangements present practical difficulties as it is not always possible adequately to heat moving tools by radiation, while the use of flexible leads or rubbing surfaces is not wholly satisfactory since the rapidity and diversity of direction of the tool movements are likely to result in frequent breakage of the leads, and rubbing surfaces are not only subject to considerable wear but also the frictional drag resulting therefrom is detrimental to proper action of the tool, particularly where a high degree of sensitivity is required.

It is, therefore, an object of this invention to provide an improved electric heating means for moving tools of shoe machines which is capable of satisfactorily heating a moving tool without the use of mechanical connections of any sort between the fixed parts of the machine and the moving tool assembly. With this end in view, an important feature of this invention is the provision in a shoe machine having a moving tool assembly, including a tool for operating upon shoes or shoe parts, of means for electromagnetically transmitting electric energy to the moving tool assembly for heating the tool thereby avoiding the necessity for mechanical connections of any kind. More specifically, and in the herein illustrated embodiment of the invention, this means comprises a transformer having a primary coil, supported on the machine frame adjacent to the moving tool assembly, and provided with a freely movable secondary coil, inductively related thereto so as to be linked to the transformer flux, and also arranged to supply heating energy to the tool. The secondary coil has sufficient freedom of movement in all directions, without contacting the primary coil or a core portion which it may surround, so that movement of the heated tool and tool assembly is substantially unrestrained.

The above and other ancillary objects and features of the invention will become apparent from the following detailed description of the illustrative embodiment shown in the accompanying drawing, and will be pointed out in the appended claims.

In the drawing,

Fig. 1 is a side view of the head of a stitch-separating machine having the improved tool-heating means applied thereto. In this figure the machine parts other than the tool are shown in dotted outline; and Fig. 2 is a front view of the machine head of Fig. 1.

The stitch-separating machine disclosed in United State patent to Perry No. 1,357,511, granted November 2, 1920, is typical of shoe machines of the kind mentioned above in that it includes such a rapidly moving tool for forming indentations between the stitches of a stitched seam in the margin of a sole of a boot or shoe to ornament the same and to emphasize the intervals between the stitches, which, during the operation of the machine, moves at a high rate of speed and in several different directions. The machine shown in the drawing is like that described in the aforementioned patent, and the machine frame 58, with the tool 20, work support 22, presser feet 24, 26 and tool holder 28 are herein designated by the same reference characters as in that specification to which reference may be had for a complete description of this machine and the action of these parts. As therein explained, the tool moves rapidly in several different directions during the operation of the machine and has a highly sensitive stitch-finding action which must not be impaired.

Figure 2:
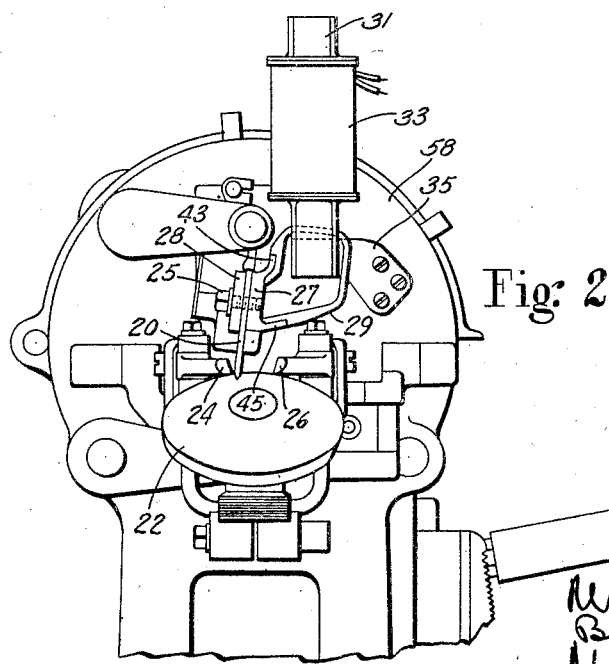

As shown in Fig. 2, the tool is gripped by a screw 25 between a grooved forward end portion of the tool holder and a separate clamping plate 27. The clamping plate is in direct contact with the tool and is made a part of a rigid secondary single-turn winding 29 of an electric transformer, the latter having a core 31 and primary winding 33 which are fixed upon a supporting bracket 35 secured to the frame of the machine above, and to one side of, the tool holder and its carrying parts. The transformer core is in the form of a vertically disposed rectangular frame built up in the usual manner from thin sheet stampings and about half a square inch in cross-sectional area, the primary winding being in two parts around the upper portions of vertically disposed side portions of the core so as to leave a lower and substantially horizontal arm of this core free. The secondary winding 29 is composed of a band of copper alloy, or other low resistance material, making up a rigid loop structure which passes once through the core frame and around the lower arm to thus be linked with the core flux of the transformer. In order to obtain a firm joint between the ends of the alloy band 29 and the plate 27 the latter has formed upon its upper and lower edges two extensions or lugs 43, 45 (shown in Fig. 2) to which the ends of the band are fastened preferably by welding.

When the tool 20 is operated the secondary winding formed by the band 29 will move bodily with it, there being sufficient clearance, where the band passes around the core, to permit the secondary winding to partake freely of the tool movements although the core and primary winding remain stationary. The plate 27 closes the secondary winding, and being made of steel or similar material forms a part of the secondary winding having greater electric resistance than the copper alloy portion. Accordingly, the current induced in the secondary coil, when the primary is suitably energized from an appropriate source of alternating current, will cause the plate 27 to become heated and thus function as an electric heating means for heating the tool.

The alloy of which the band 29 is made is preferably copper with 1% cadmium, this alloy being one which gives considerable added rigidity as compared with unalloyed copper, particularly at the comparatively high temperature at which the band will normally operate.

It has been found that a consumption of about 100 watts in the transformer is sufficient to heat the tool of a machine of the character above indicated, the amperage produced in the secondary winding being of the order of 1000. The primary winding of the transformer will naturally depend upon the voltage of the supply available but with a view of having a fairly small number of coils in the primary winding in order that the conductors may be robust but still form a compact winding, it will be desirable to employ a supply of low voltage current, say about twelve volts, thereto.

Having described the invention, what is claimed as new and desire to secure by Letters Patent of the United States is:

1. A machine for operating upon shoe parts having, in combination, a frame, a tool assembly including a tool, a holder for the tool and a clamping plate, said assembly being mounted on the frame for movement in a plurality of directions, a transformer supported on the frame having a core portion adjacent to said assembly, and a conductor surrounding the core portion and forming the secondary coil of the transformer, said conductor being spaced from the core portion sufficiently to accommodate all movements of said assembly and connected at each end to said clamping plate whereby the clamping plate is heated by current induced in said secondary coil to heat the tool during the operation of the machine.

2. A stitch-separating machine having, in combination, a frame, a stitch-separating tool arranged to move in a plurality of directions relative to the frame during the operation of the machine, and electric heating means comprising a transformer having a primary coil fixed on the frame and a freely movable secondary coil, said secondary coil being movable with said tool in direct heat transferring relation thereto.

3. In a stitch-separating machine, in combination, a frame, a tool assembly including a tool, a holder for the tool and a clamping plate, said assembly being mounted on the frame for movement in a plurality of directions, a transformer supported on the frame having a core portion adjacent to said assembly, and a conductor surrounding the core portion and forming the secondary coil of the transformer, said conductor being spaced from the core portion sufficiently to accommodate all movements of said assembly and connected at each end to said clamping plate whereby the clamping plate is heated by current induced in said secondary coil to heat the tool during the operation of the machine.

4. A machine for operating upon shoe parts having, in combination, a frame, a tool assembly including a tool and a holder for the tool, said assembly being mounted on the frame for movement in a plurality of directions, a transformer supported on the frame having a core portion adjacent to said assembly, and a conductor surrounding the core portion and forming the secondary coil of the transformer, said conductor being spaced from the core portion sufficiently to accommodate all movements of said assembly and connected at each end to said holder whereby the holder is heated by current induced in said secondary coil to heat the tool during the operation of the machine.

5. In a stitch-separating machine, in combination, a frame, a tool assembly including a tool and a holder for the tool, said assembly being mounted on the frame for movement in a plurality of directions, a transformer supported on the frame having a core portion adjacent to said assembly, and a conductor surrounding the core portion and forming the secondary coil of the transformer, said conductor being spaced from the core portion sufficiently to accommodate all movements of said assembly and connected at each end to said holder whereby the holder is heated by current induced in said secondary coil to heat the tool during the operation of the machine.

WILLIAM SELWYN ROBSON.